United States Patent
Kim

(10) Patent No.: US 7,149,181 B2
(45) Date of Patent: Dec. 12, 2006

(54) APPARATUS AND METHOD FOR RE-TRANSMITTING ERRONEOUS PACKET DATA

(75) Inventor: Bo Kyung Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 1273 days.

(21) Appl. No.: 09/801,682

(22) Filed: Mar. 9, 2001

(65) Prior Publication Data
US 2001/0021984 A1    Sep. 13, 2001

(30) Foreign Application Priority Data
Mar. 9, 2000   (KR) .............................. 2000-11670

(51) Int. Cl.
*H04L 12/56* (2006.01)
(52) U.S. Cl. .................. 370/216; 370/235; 370/412; 455/69; 714/18
(58) Field of Classification Search ............. 370/216, 370/229, 235, 241, 242, 246, 249, 310, 349, 370/389, 394, 412, 414, 418, 428, 429; 455/69, 455/91, 115; 714/18
See application file for complete search history.

(56) References Cited

U.S. PATENT DOCUMENTS

| | | | |
|---|---|---|---|
| 5,781,598 A * | 7/1998 | Hardy, III | 375/372 |
| 5,841,775 A * | 11/1998 | Huang | 370/422 |
| 6,157,612 A * | 12/2000 | Weerackody et al. | 370/215 |
| 6,314,535 B1 * | 11/2001 | Morris et al. | 714/708 |
| 6,631,132 B1 * | 10/2003 | Sourani | 370/389 |

FOREIGN PATENT DOCUMENTS

CN    1166739 A    12/1997

* cited by examiner

*Primary Examiner*—Seema S. Rao
*Assistant Examiner*—Shick Hom
(74) *Attorney, Agent, or Firm*—Fleshner & Kim, LLP

(57) ABSTRACT

An apparatus and method for re-transmitting erroneous packet data is disclosed. Each of the physical layers of the system includes a buffer, a timer, a controller, and a radio frequency unit. The buffer temporarily stores transmitted data in the form of a final data frame capable of being transmitted on a transmission line without any processing. The timer is a time counter adapted to limit the time, for which the transmission end waits for an acknowledgment to a transmission of data after the data transmission is made. If no acknowledgment signal is received when the timer expires the buffered data in the physical layer is re-transmitted. This reduces the data transmission delay resulting from the inter-layer movement of data generated during a re-transmission of erroneous data, and the transmission delay of packet data resulting from overhead time.

23 Claims, 4 Drawing Sheets

APPARATUS AND METHOD FOR RE-TRANSMITTING ERRONEOUS PACKET DATA

BACKGROUND OF THE INVENTION

1. Field of the Invention

The present invention relates to a communication system, and more particularly to an apparatus and method for re-transmitting erroneous packet data on a physical layer of the communication system.

2. Background of the Related Art

A system that is used for data communications between open system interconnections (OSIs), is divided into 7 layers in terms of functional commonality and independence. For respective layers, necessary protocols are stipulated. In most current wire and wireless communication systems, seven such OSI Layers are referenced.

The seven OSI Layers include a physical layer (Layer 1), a data link layer (Layer 2), a network layer (Layer 3), a transport layer (Layer 4), a session layer (Layer 5), a presentation layer (Layer 6), and an application layer (Layer 7).

Generally, transmission data is generated at an upper layer, for example, Layer 7, Layer 6, Layer 5, or Layer 4. This data is then applied to a lowermost layer via intermediate layers. The transmission data from the lowermost layer is then transmitted to the lowermost layer of the counterpart via a physical medium, for example, a line, so that it is finally transmitted to a desired intermediate or upper layer.

Re-transmission of erroneous data is typically carried out at the data link layer (Layer 2) or the transport layer (Layer 4).

The re-transmission at the data link layer (Layer 2) is achieved using a Go-Back-N method or a Selective-Repeat method. The Go-Back-N method is a method in which the transmission data is re-transmitted in response to a negative acknowledgment (NAK) signal indicative of an error in the transmission data. On the other hand, in accordance with the Selective-Repeat method, only the erroneous data is re-transmitted.

The re-transmission at the transport layer (Layer 4) is typically achieved using TCP/IP. In accordance with this method, if there is no acknowledgment (ACK) signal from the reception end to indicate a normal reception of 8-Kbyte data, the 8-Kbyte data is re-transmitted from the transmission-end TCP/IP (Layer 4).

A system for transmitting packet data may be either a circuit mode or a packet mode in accordance with the type of transmission data. In the circuit mode system, a path is set between a transmission node and a reception node so that the path is exclusively used until the connection between the transmission and reception nodes is cut off.

In accordance with the packet mode system, data is transmitted in the form of packets, each having a desired length. Accordingly, one line can be simultaneously used by a plurality of terminals without being exclusively used by one terminal. In the packet mode system, it is necessary to use overhead data, indicative of the destination of data and the start and end of data, for every packet. The data transmission time is increased by the overhead prefixed to each packet. The same problem is involved when data must be re-transmitted due to the generation of errors in the packet data.

FIG. 1 is a block diagram illustrating a related art procedure for re-transmitting erroneous packet data. Respective general functions of layers illustrated in FIG. 1 will now be described.

Transport layers 10 and 15 (Layer 4) manage the quality of the communication network for transmission of data. Each of the network layers (Layer 3) (not shown) executes a desired routine using the communication network, and sets a connection to the counterpart system. Data link layers 20 and 25 (Layer 2) establish line links, detect transmission errors, and recover those transmission errors. Physical layers 30 and 35 (Layer 1) control electrical and mechanical conditions to allow a physical connection of lines, and a maintenance and cut-off of that physical connection. The physical medium 40 is typically a wire or wireless transmission line for transmitting data signals received from the physical layers 30 and 35. In FIG. 1, the network layers are not shown for the convenience of illustration. Also, the transport layers are denoted by "TCP/IP".

The related art re-transmission method for erroneous packet data will now be described in conjunction with FIG. 1.

The transmission-end terminal (base station) of a WLL system generates data at its upper layer, and applies the generated data to Layer 1 30 via Layer 2 20. The data from Layer 1 30 is transmitted to Layer 1 35 of the reception-end terminal, and then sent to the upper layer of the reception-end terminal via the layers of the reception-end terminal.

The method for processing errors generated during the above transmission procedure may be varied, depending on the transmission control method used.

In accordance with a Go-Back-N method and a selective-repeat method, re-transmission of data is carried out by the data link layers 20 and 25. When the base station data link layer 20 is informed of the generation of errors from the reception end, it re-transmits associated data stored in its buffer. This data is sent to the reception-end physical layer (Layer 1) 35 via a wireless transmission line via the base station physical layer (Layer 1) 30. The data is finally transmitted to the reception-end data link layer 25.

In accordance with the re-transmission method using TCP/IPs, the transport layers 10 and 15 carry out re-transmission of data. When the transmission-end transport layer 10 is informed of the generation of errors from the reception end, it re-transmits associated data stored in its buffer. This data is then sent to the reception-end physical layer (Layer 1) 35 via Layer 3, Layer 2 20, Layer 1 30, and a wire transmission line. Finally, the data is transmitted to the reception-end transport layer 15 via the reception-end Layer 2 25 and Layer 3.

Packet data, which is transmitted as mentioned above, has overhead data added to it at its leading and trailing ends, respectively. The overhead data added to the leading end of the packet data contains information regarding synchronization and destination address, etc. The overhead data added to the trailing end of the packet data contains information regarding the detection and correction of errors generated during the transmission of data. For example, where data is transmitted for 5 to 107 ms, the leading and trailing overheads take transmission times of 60 ms and 20 ms, respectively. Thus, the time taken to transmit the overheads in the packet mode is substantially equal to the transmission time of associated data.

The related art method of handling erroneous data has various problems. For example, the delay of transmission resulting from the overhead transmission time is importantly treated in the Go-Back-N method and the TCP/IP re-transmission method inevitably involving the re-transmission of a frame with a certain size or at a certain interval, as compared to the selective repeat method adapted to re-transmit only a particular frame involving errors.

Furthermore, the re-transmission of data is delayed until the erroneous data reaches the upper layer because it is carried and requested out by the upper layer. For this reason, loss of time is inevitably involved.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide an apparatus and method for re-transmitting erroneous packet data that substantially obviates problems caused by limitations in the related art.

It is another object of the present invention to provide an apparatus and method for re-transmitting erroneous packet data that is capable of reducing the data transmission delay resulting from the inter-layer movement of data generated during a re-transmission of erroneous data.

It is another object of the present invention to provide an apparatus and method for re-transmitting erroneous packet data that reduces a transmission delay of packet data resulting from overhead time.

It is another object of the present invention to provide an apparatus and method for re-transmitting erroneous packet data that improves the efficiency and speed of data transmission.

To achieve at least the above objects, in whole or in parts, there is provided an apparatus for re-transmitting erroneous packet data in a wireless local loop, comprising a buffer for storing data transmitted, to prepare the data for an erroneous transmission of the data, a timer for limiting a time taken to wait for an acknowledgment to the transmission of the data, a controller for controlling the buffer and the timer to allow a data re-transmission function to be carried out, and a radio frequency unit for transmitting packet data over the air under the condition in which the packet data is entrained in a radio frequency signal.

To further achieve at least the above objects, in whole or in parts, there is provided a method for re-transmitting erroneous packet data in a wireless local loop, comprising the steps of (a) transmitting data while storing the data in a buffer, (b) operating a timer simultaneously with the transmission of the data, thereby counting a time taken to wait for an acknowledgment to the transmission of the data, and (c) if no acknowledgment signal is received until the operation of the timer is terminated or if a negative acknowledgment signal is received, then re-transmitting the data stored in the buffer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
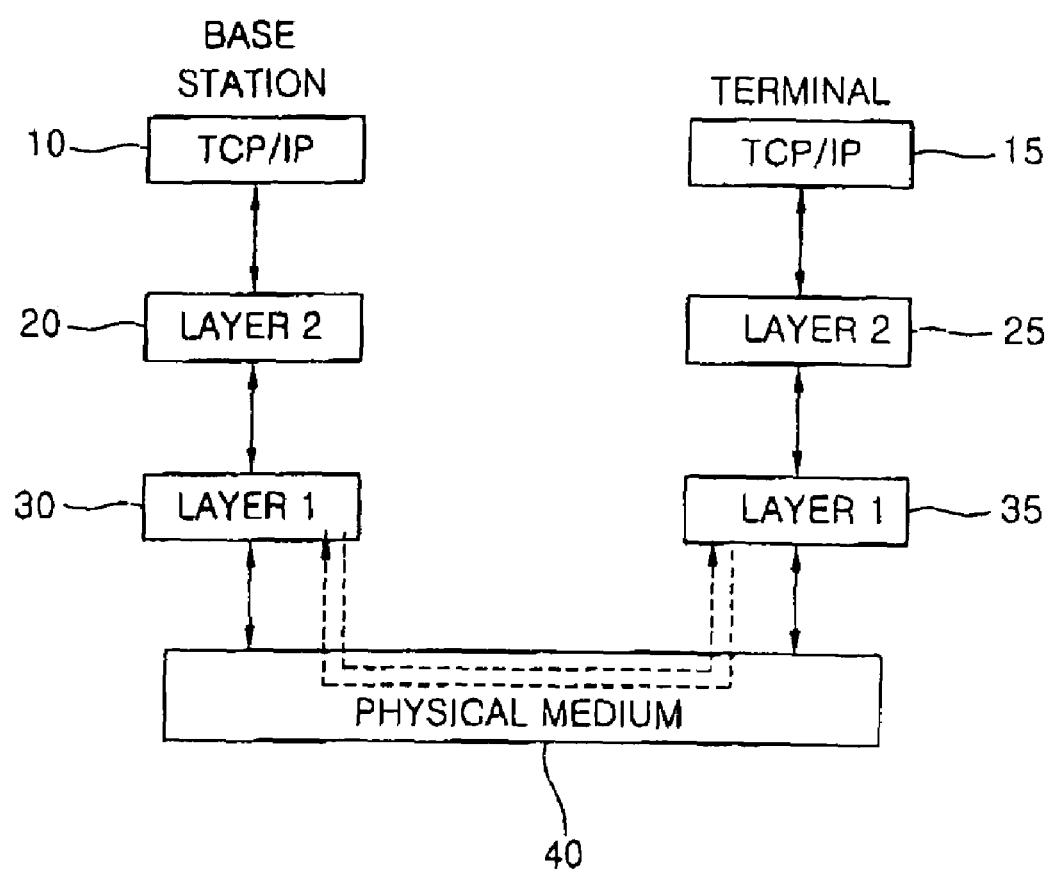
FIG. 2 is a block diagram illustrating a method for re-transmitting erroneous packet data in accordance with a preferred embodiment of the present invention.
Figure 3:
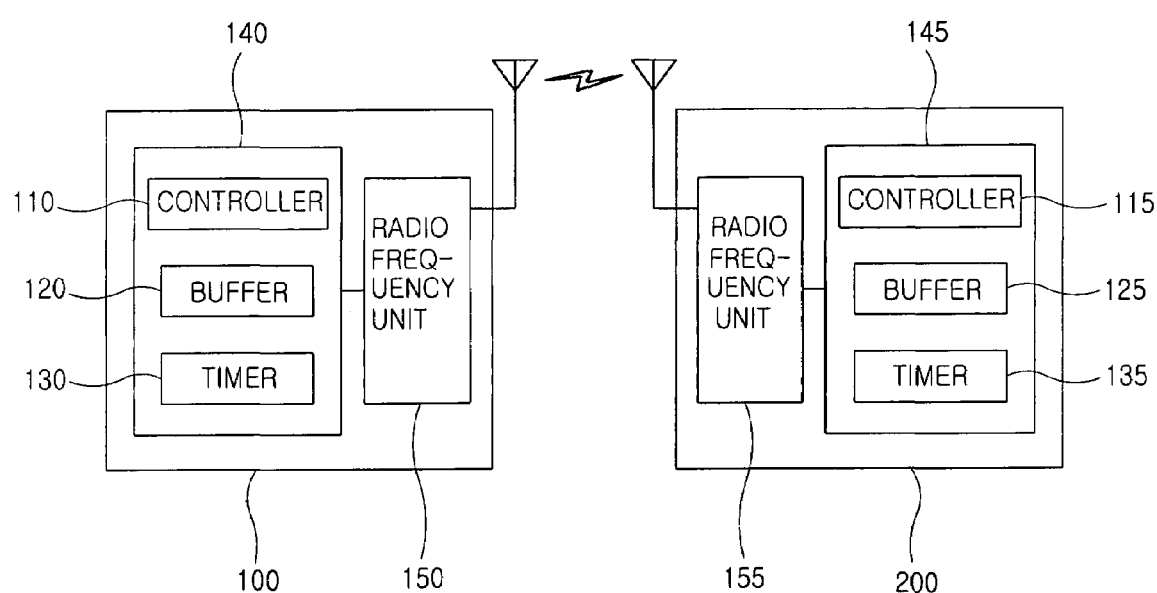
FIG. 3 is a block diagram illustrating the structure of a physical layer adapted to re-transmit erroneous packet data according to a preferred embodiment of present invention.

FIG. 2 is a block diagram illustrating a method for re-transmitting erroneous packet data in accordance with the preferred embodiments of the present invention. FIG. 3 is a block diagram illustrating the structure of a physical layer adapted to re-transmit erroneous packet data.

Figure 1:
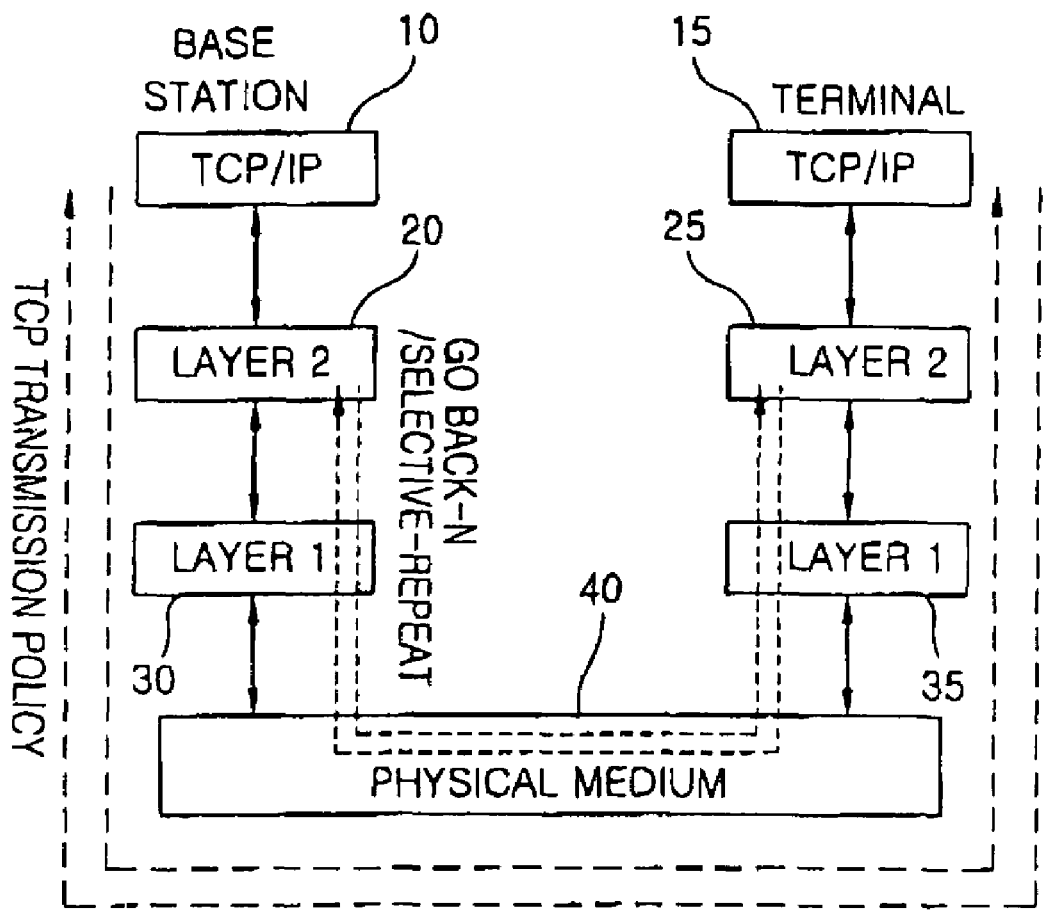
FIG. 1 is a block diagram illustrating a related art procedure for re-transmitting erroneous packet data.

The functions and operations of respective layers illustrated in FIG. 2 are the same as those of the related art case illustrated in FIG. 1. In accordance with the present invention, however, the re-transmission of erroneous data is carried out by physical layers 30 and 35, rather than the transport layers 10 and 15 or data link layers 20 and 25. As shown in FIG. 3, the physical layer 140 preferably includes a controller 110, a buffer 120, a timer 130, and a radio frequency unit 150. Likewise, the physical layer 145 includes a controller 115, a buffer 125, a timer 135, and a radio frequency unit 155.

Each of the buffers 120 and 125 serves to temporarily store data that has been transmitted. Data stored in each of the buffers 120 and 125 preferably has the form of a final data frame capable of being transmitted on a transmission line without any processing.

Each of the timers 130 and 135 is a time counter adapted to limit the time for which the transmission end waits for an acknowledgment of the transmission of data after the data transmission has been made.

The controllers 110 and 115 control respective buffers 120 and 125, and respective timers 130 and 135, in order to enable functions required for transmission of data to be carried out.

Each of the radio frequency units 150 and 155 serves to transmit packet data, preferably over the air, under the condition in which the packet data is modulated in a signal of a desired radio frequency.

Figure 4:
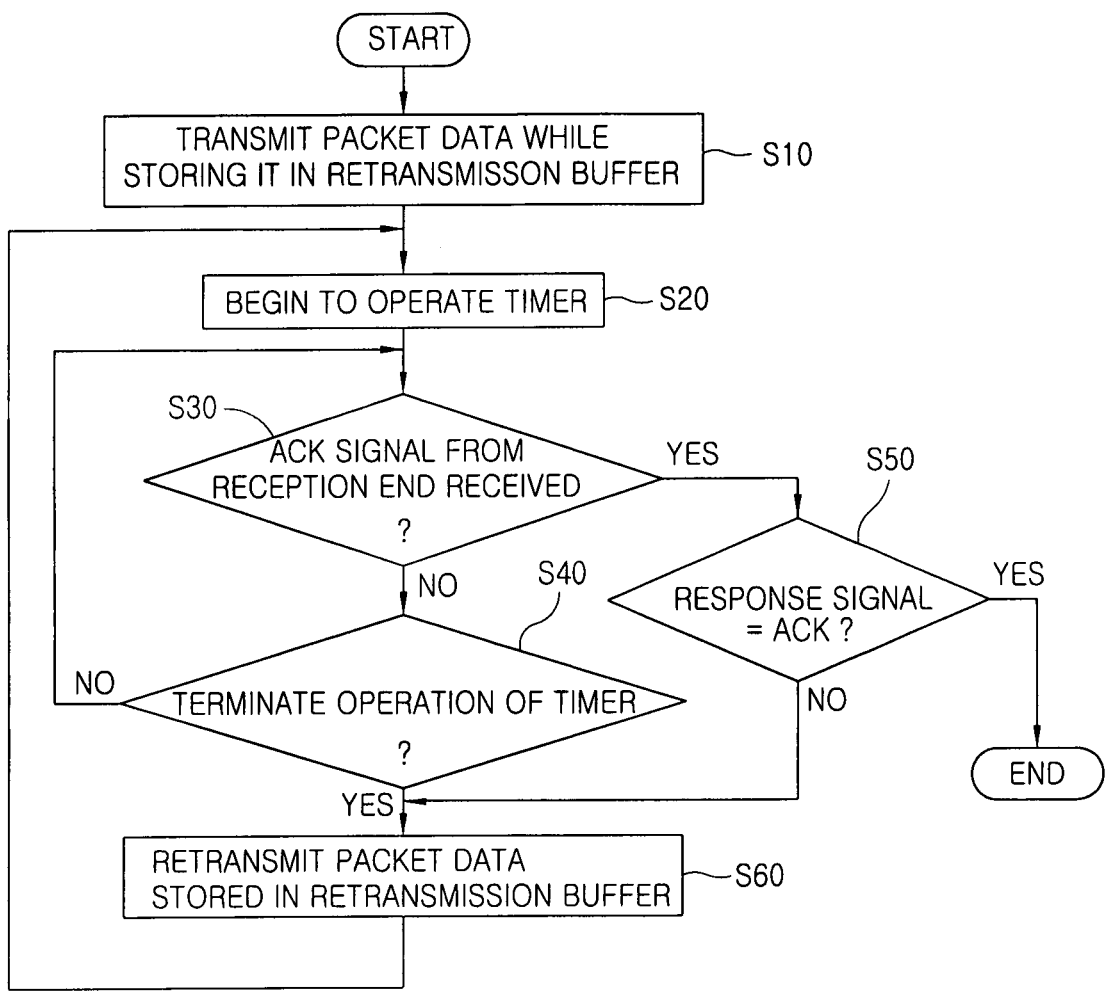
FIG. 4 is a flow chart illustrating a method for re-transmitting data erroneously transmitted, in accordance with the preferred embodiment of the present invention.

FIG. 4 is a flow chart illustrating the method for re-transmitting erroneously transmitted data, in accordance with the preferred embodiments of the present invention.

The base station 100 and terminal 200 of the WLL system illustrated in FIG. 3 may serve as a transmission end and a reception end, respectively, and vice versa. Since these base station and terminal have the same function, they are referred to as a transmission end and a reception end, respectively, for the convenience of description.

Data generated from an upper layer included in a transmission-end data transmitting unit, that is, Layer 4, Layer 5, Layer 6, or Layer 7, is applied to the physical layers 140 and 145 via Layer 3 and Layer 2. The data is preferably transmitted over the air via respective radio frequency units 150 and 155, after having been processed in accordance with a desired transmission procedure conducted by the physical layers 140 and 145.

A method of re-transmitting erroneously transmitted data according to a preferred embodiment of the present invention will be described in conjunction with FIG. 4.

Data generated from an upper layer, that is, Layer 4, Layer 5, Layer 6, or Layer 7, is stored in the buffers 120 and 125 before being transmitted (Step S10). In response to the data storage, the timers 130 and 135 begin to operate (Step S20). Each of the timers 130 and 135 is adapted to limit the time for which the transmission end waits for an acknowledgment of the transmission of data after the data transmission has been made.

When the timers 130 and 135 operate, the controllers 110 and 115 check whether or not an acknowledgment signal corresponding to "ACK (Acknowledgment)" or "NAK (Negative Acknowledgment)" is received (Step S30). If no acknowledgment signal is received, the controllers 110 and 115 repeatedly conduct the checking procedure until the operations of the timers 130 and 135 are terminated. (Step S40). If the acknowledgment signal is received before the operations of the timers 130 and 135 are terminated, the operations of the timers 130 and 135 are forcedly terminated.

Where the acknowledgment signal corresponds to "ACK", the above procedure is terminated without any re-transmission of data.

On the other hand, where the acknowledgement signal corresponds to "NAK", the controllers 110 and 115 re-transmit associated data stored in the buffers 120 and 125, respectively (Steps S50 and S60).

If the timers 130 and 135 terminate before the acknowledgment signal is received, the associated data stored in the buffers 120 and 125 is re-transmitted, as in the case in which the acknowledgement signal corresponding to "NAK" is received (Step S60). The re-transmission procedure is repeated until the acknowledgement signal corresponding to "ACK" is received.

The apparatus and method for re-transmitting erroneous packet data in accordance with the preferred embodiment of the present invention has many advantages. For example, it can reduce the data transmission delay resulting from the inter-layer movement of data generated during a re-transmission of erroneous data. Additionally, it can reduce the transmission delay of packet data resulting from overhead time because the re-transmission of erroneous data is conducted by the lowermost layers, that is, the physical layers 140 and 145, as compared to the case in which the re-transmission of erroneous data is conducted by upper layers such as TCP/IP layers or data link layers. Accordingly, it is possible to enable a rapid data transmission. This results in a reduction in the load of the communication system, thereby allowing an improvement in reliance to be expected.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for re-transmitting erroneous packet data in a communication system, comprising:
    a buffer coupled to store transmitted data;
    a controller configured to control the buffer to allow a data re-transmission function to be carried out; and
    a radio frequency unit configured to transmit the data to a receiving apparatus,
    wherein the buffer, the controller, and the radio frequency unit operate in a physical layer, and
    wherein the data re-transmission function re-transmits the transmitted data stored in the buffer directly from the physical layer to a corresponding physical layer of the receiving apparatus without receiving a copy of the transmitted data from another layer above the physical layer.

2. The apparatus of claim 1, wherein the buffer is adapted to store a final data frame.

3. The apparatus of claim 1, wherein the controller is adapted to transmit only data that has been previously transmitted with errors.

4. The apparatus of claim 1, wherein the communication system is a wireless local loop.

5. The apparatus of claim 1, wherein the data is re-transmitted from the buffer after a prescribed period of time if no acknowledgment of the transmitted data has been received.

6. The apparatus of claim 5, wherein the transmitted data stored in the buffer is stored as a final date frame in a physical layer.

7. The apparatus of claim 5, wherein the data is re-transmitted from the buffer before the expiration of the prescribed period of time if a negative acknowledgment is received.

8. The apparatus of claim 1, further comprising a timer configured to initiate a countdown when the data is transmitted, wherein the countdown of the timer is stopped and reset if an acknowledgment of the transmitted data is received before the timer expires.

9. The apparatus of claim 1, wherein the transmitted data stored in the buffer is re-transmitted from the buffer if a negative acknowledgment is received.

10. The apparatus of claim 9, wherein the transmitted data stored in the buffer is stored as a final data frame in a physical layer.

11. A method for re-transmitting erroneous packet data, comprising:
    (a) transmitting data while storing the data in a buffer on a physical layer; and
    (b) re-transmitting the data stored in the buffer if no acknowledgment signal is received within a prescribed period of time or if a negative acknowledgment signal is received,
    wherein step (b) comprises:
    re-transmitting the data stored in the buffer directly from the physical layer to a physical layer of a corresponding receiving apparatus without re-receiving the transmitted data from an upper layer.

12. The method of claim 11, wherein step (b) comprises:
    terminating the re-transmission procedure if an acknowledgment signal is received; and
    repeatedly checking whether or not the acknowledgment signal is received, until the prescribed period of time elapses if no acknowledgment signal is received.

13. The method of claim 11, wherein step (b) is repeatedly carried out until the acknowledgment signal is received.

14. The method of claim 13, wherein a timer tracks the prescribed period of time and is reset when the data is re-transmitted or when an acknowledgment is received.

15. The method of claim 11, wherein the buffer is adapted to store a final data frame.

16. The method of claim 15, wherein the re-transmission of the final data frame from the buffer occurs on the physical layer.

17. The method of claim 11, wherein the data re-transmission is made only for data involving errors.

18. The method of claim 11, wherein the data is transmitted in a wireless local loop.

19. A method of re-transmitting data in a communication system, comprising:
   transmitting data from a transmitting terminal on a physical layer, said data being originally received from a layer above the physical layer;
   storing the transmitted data in a physical layer buffer of the transmitting terminal; and
   re-transmitting the stored data from the buffer if the transmission is faulty,
   wherein re-transmitting the stored data re-transmits the stored data directly from the physical layer to a physical layer of a receiving apparatus without re-receiving the data from another layer above the physical layer.

20. The method of claim 19, wherein the transmitted data is stored as final data frame.

21. The method of claim 19, wherein the stored data is re-transmitted if receipt of the data is not acknowledged within a prescribed period of time.

22. The method of claim 21, wherein the stored data is re-transmitted if a negative acknowledgment is received during the prescribed period of time.

23. The method of claim 19, wherein the communication system is a wireless local loop.

* * * * *